April 24, 1956   B. C. CASE   2,742,848
CORN POPPING MACHINE
Filed Sept. 23, 1950   5 Sheets-Sheet 1

Fig.1

INVENTOR
Burgess C. Case
BY
J. P. Moran
ATTORNEY

Fig. 2

April 24, 1956     B. C. CASE     2,742,848
CORN POPPING MACHINE

Filed Sept. 23, 1950     5 Sheets-Sheet 4

INVENTOR
Burgess C. Case
BY
ATTORNEY

April 24, 1956  B. C. CASE  2,742,848
CORN POPPING MACHINE
Filed Sept. 23, 1950  5 Sheets-Sheet 5

INVENTOR
Burgess C. Case
BY
ATTORNEY

United States Patent Office 2,742,848
Patented Apr. 24, 1956

2,742,848
CORN POPPING MACHINE

Burgess C. Case, Plainfield, N. J.

Application September 23, 1950, Serial No. 186,417

16 Claims. (Cl. 99—238.1)

This invention relates in general to improvements in the construction and mode of operation of corn popping machines, and, more particularly, of coin-operated automatic corn popping machines, which, on the insertion of a predetermined coin, with the machine in its normal operating condition, will pass through a cycle of operations beginning with the movement of a corn cup loaded with raw corn into a dumping position relative to a reciprocating or oscillating popping basket, the dumping of the corn cup, the return of the cup to its corn loading position, the popping of the raw corn in the basket for a predetermined time while in contact with a liquified seasoning or cooking oil at a predetermined temperature, and the lifting of the popping basket to a position where the popped corn is discharged through a chute into a bag, of the general type disclosed in my prior patent No. 2,216,-805 and copending joint application with J. Lindstrom, Serial No. 786,190, filed November 15, 1947, now Patent No. 2,657,627, issued November 3, 1953.

In such machines, the corn popping action is effected by maintaining the batch of raw popcorn in contact with a predetermined amount of cooking oil, such as cocoanut or cottonseed oil, in the popping chamber formed by the oscillating basket, at a predetermined temperature for a predetermined popping period. For best results, a high grade hybrid type popcorn having a moisture content not less than 12% should be used. In order to pop such corn to its maximum burst or volumetric increase, without husks, and in a tenderized condition, and to secure a popped product uniform in quantity and quality regardless of the number of operating cycles and periods between operating cycles, it is essential that the amount of raw corn, cooking oil in the popping chamber, popping period, and temperature in the popping chamber, be coordinated and maintained uniform for each cycle.

Such cooking oils present a major problem as the necessary popping chamber temperature is in excess of 400° F. and the available cooking oils have been found to break down when heated to a temperature above 350° F. due to thermal cracking of the oil and/or oxidation of certain oxidizable constituents. Where a bath of cooking oil is retained in the popping chamber between popping periods and maintained at or above the breakdown temperature, the breakdown of the oil is increased and an undesirable gum deposit is rapidly formed in the container defining the popping chamber, usually adjacent the liquid level therein. This gum deposit hardens and must periodically cleaned by a special chemical cleaning operation. As the deposit builds up, the operating parts tend to bind against each other, hindering the mechanical operation, as well as leaving the machine in an unsightly unsanitary condition.

In accordance with the present invention, the maintenance of a hot cooking oil bath in the popping chamber between popping cycles is avoided and the amount of cooking oil normally required for each popping period introduced into the popping chamber at a temperature corresponding to or approaching the desired popping chamber temperature immediately prior to the introduction of the batch of raw corn. The desired popping chamber temperature is maintained by a specially constructed electrically heated metallic popping plate forming the bottom of the popping chamber. The deposition on the popping plate of a batch of raw pop corn at substantially room temperature, and any temperature difference between the cooking oil as introduced and the plate, tend to result in a temperature shock to the plate which would affect the popping chamber temperature. A special arrangement and automatic control of the electrical heating means are provided to minimize the temperature shock to the popping plate and the effect on the popping chamber temperature. Special provisions are also made for maintaining a supply of cooking oil sufficient for at least one operating cycle under non-oxidizing conditions and at a temperature substantially as high as the desired popping temperature and introducing a predetermined amount of the preheated oil into the popping chamber at a predetermined time in such a manner that the oil enters the popping chamber in a solid stream which is rapidly distributed over the surface of the popping plate. These oil supply provisions are also constructed and arranged to eliminate any oil dripping therefrom.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which is illustrated and described a preferred embodiment of the invention.

Figure 2:
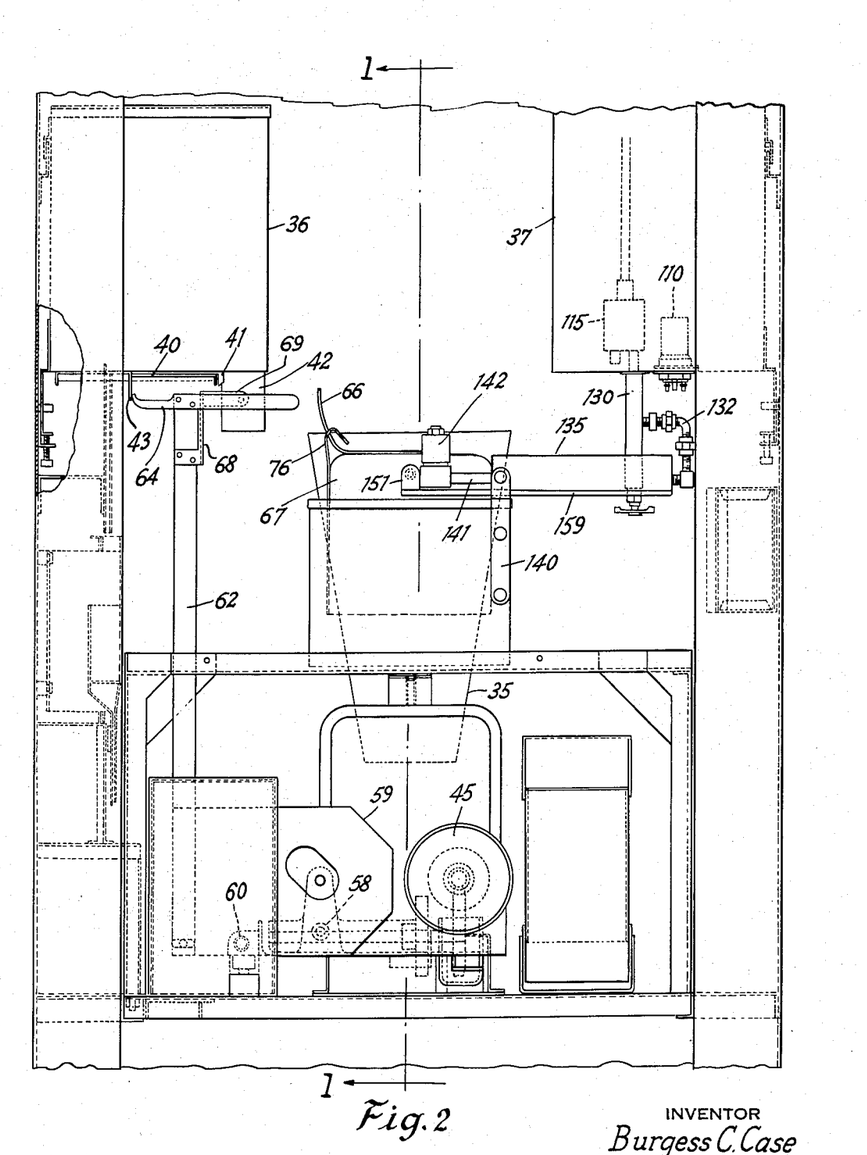
Fig. 2 is a rear view of the operating mechanism shown in Fig. 1.

The automatic coin-operated corn popping machine illustrated in the drawings is contained within a cabinet 30 of substantially rectangular horizontal and vertical cross-section having a front door 31 containing an opening 32 for the insertion of a bag by the customer into an open-faced shell forming a bag receiver compartment 33. The machine is supported on a chassis 34 removably mounted on brackets secured to the side walls of the cabinet. A tapering popped corn chute 35 opens through the top of the compartment 33. The upper part of the cabinet contains a raw corn tank 36 and a cooking oil tank 37. As shown in Fig. 2, the tanks 36 and 37 are adjustably mounted on the side walls of the cabinet to facilitate the proper positioning of the tanks relative to the operating mechanism.

As disclosed in said copending application, the discharge of corn through an opening in the bottom of the tank 36 is controlled by the position of a spring loaded shut-off slide 40. The inner end of the slide has a depending curved lip 41 adapted to contact with a pivoted corn cup 42. A depending flange 43 on the slide is contacted to move the slide outwardly as the corn cup is moved into its corn loading position.

Figures 12, 13, 14, 15:
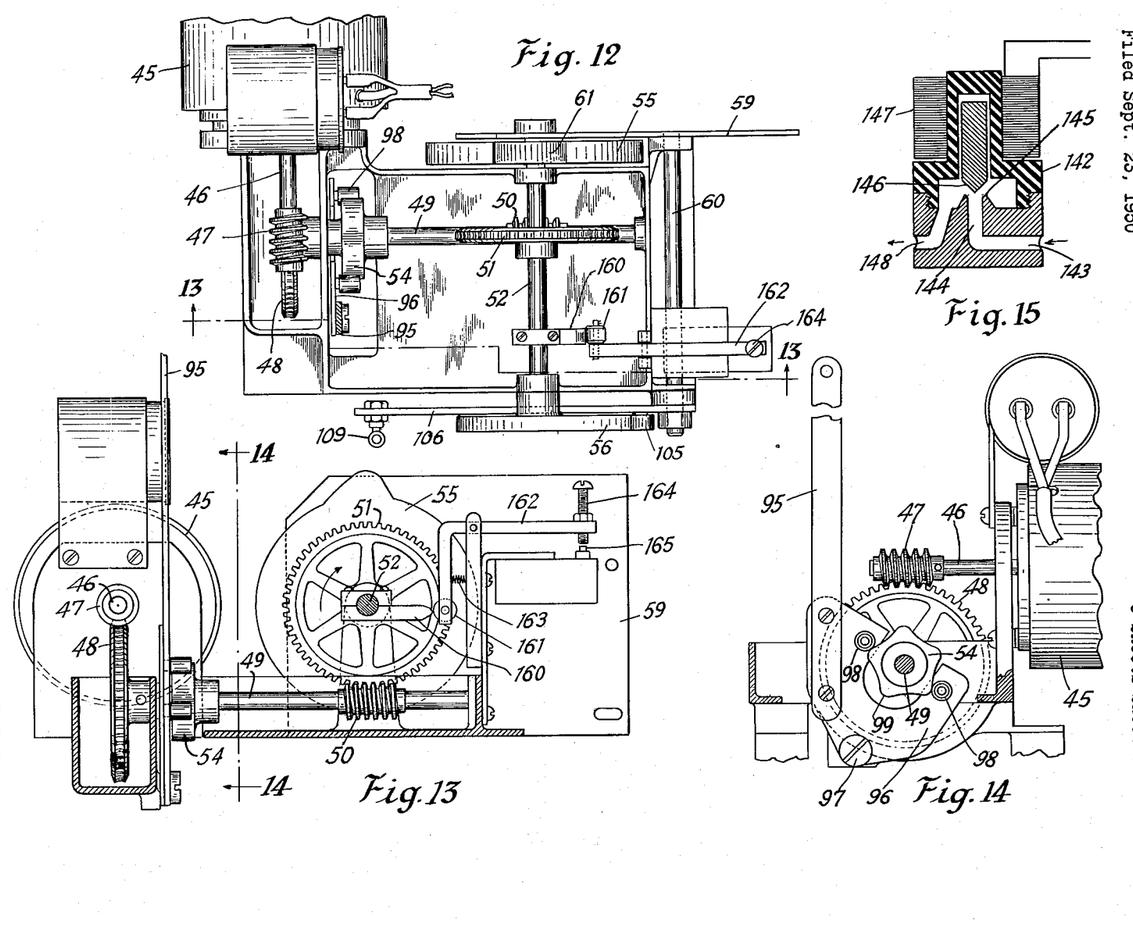
Fig. 12 is a plan view of the motor and drive assembly.
Fig. 13 is a vertical section taken on the line 13—13 of Fig. 12.
Fig. 14 is a vertical section taken on the line 14—14 of Fig. 13.
Fig. 15 is a sectional elevation of the solenoid valve.

The driving mechanism of the machine comprises a constant speed capacitor type electric motor 45 driving a shaft 46 carrying a worm 47 meshing with a worm wheel 48 on a shaft 49. The shaft 49 carries a worm 50 meshing with a worm wheel 51 on a shaft 52. A popping basket oscillating or agitator cam 54, shown in Fig. 14, is mounted on the shaft 49. The shaft 52 has a corn loading cam 55, and a basket dumping cam 56, mounted on the rear and front ends thereof respectively.

As disclosed in said copending application, the loading cam 55 is of the internal type and has a cam groove in its rear face in which rides a cam roller 58 carried by a plate 59 pivoted on a pivot shaft 60. The cam groove is shaped with a single peak or lobe 61 which causes the roller 58 and plate to oscillate about the axis of shaft 60 to move a vertical arm 62, bolted to the outer edge portion of the plate 59, between corn loading and corn dumping positions. A horizontally arranged finger 64 is secured on the upper end of the arm 62, with its outer section curved upwardly as shown in Fig. 2 to abut the inner face of the flange 43 and its inner section rearwardly offset and arranged to abut an upwardly curved tongue 66 on the cover 73 of a popping basket 67. The arm 62 also carries an L-shaped bracket 68, the vertical leg of which is flexible and slightly spaced from the arm and terminates in a yoke 69, in which the corn cup 42 is pivotally mounted.

At the start of the operating cycle, the slide 40 is retracted and the cup is in its loading position shown in Fig. 2 where it has been filled by gravity through the corn tank hole. As the loading cam actuates the cup arm 62 to move the loaded cup from under the tank, the shut-off slide follows to cover the bottom of the tank hole and prevent any corn from spilling from the tank. The corn cup is constructed so that its center of gravity when fully loaded will be in vertical alignment with its pivot axis, and when empty will be outwardly offset, so that the cup will be tilted with its upper end towards the corn tank during its return movement.

Figure 10:
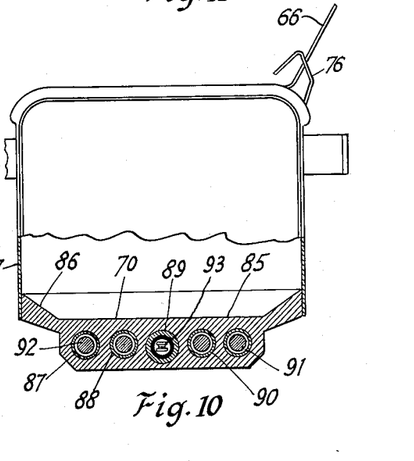
Fig. 10 is a front end view, partly in section, of the popping basket.

The corn popping basket 67, as shown in Figs. 8–11, is of substantially rectangular cross-section with imperforate side and rear walls, an electrically heated bottom plate 70 hereinafter described, a front discharge door 71 hinged at its lower end, and a top 72 closed except for the hinged cover 73. A hinge spring 75 maintains the cover closed until the finger 64 rides on the tongue 66 to raise the cover to allow the corn cup to dump. Dumping of the raw corn is effected by the corn cup engaging a snubbing post 76 on the outer side of the basket midway of its length and formed by a plate bent as shown in Fig. 10. The loaded corn cup is moved laterally until its lower edge contacts with the post 76, causing the cup to tilt about its pivot axis, and the continued movement of the arm 62 flips the pivoted cup over the top of the post sufficiently to discharge all of the corn therein down the surface of the post into the popping basket.

Figure 1:
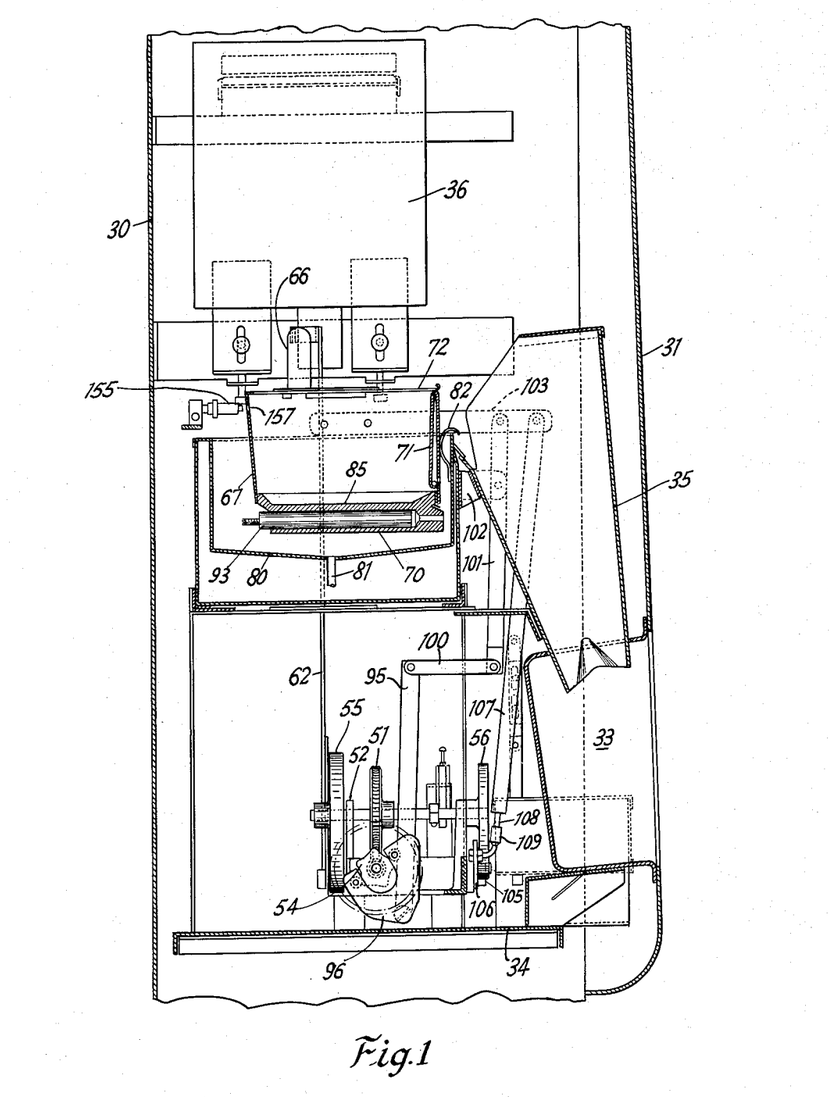
Fig. 1 is a sectional elevation of a corn popping machine constructed in accordance with the invention, taken on the line 1—1 of Fig. 2.

The popping basket is oscillatably supported, as hereinafter described, in a waste drain pan 80 arranged to receive any cooking oil dropping from the basket, as shown in Fig. 1. The pan has a waste pipe connection 81 leading to a suitable waste receptacle (not shown). A forwardly curved leaf spring 82 mounted on the front side of the waste pan continuously presses against the basket door 71 and holds the door in its closed position while the basket is reciprocated within the pan. The spring curvature permits the basket to be returned to its normal position in the pan without interference.

Figure 8:
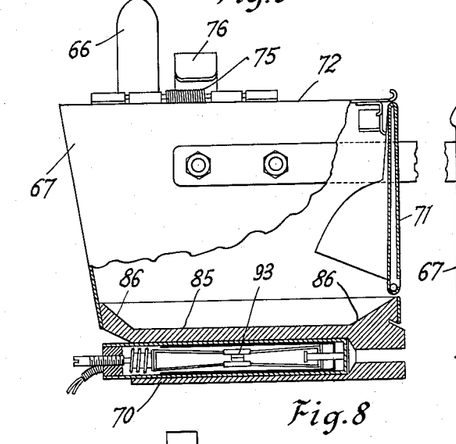
Fig. 8 is an elevation partly in section of the popping basket.
Figure 9:
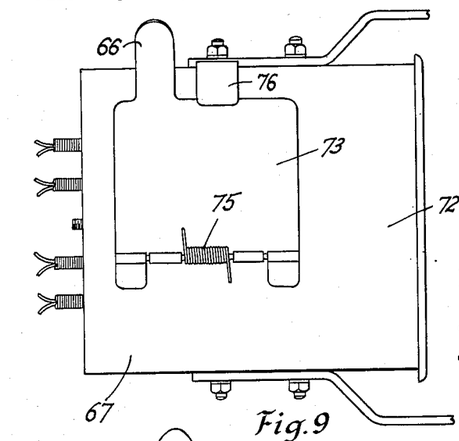
Fig. 9 is a plan view of the popping basket.
Figure 11:
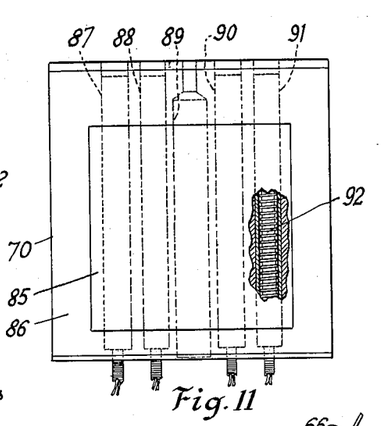
Fig. 11 is a plan view of the popping basket bottom plate.

As shown in Figs. 8, 10 and 11, the bottom plate 70 of the popping basket is formed by a relative thick plate of a high thermal conductivity metal, such as aluminum. The metal plate has a flat rectangular upper surface 85 surrounded by sloping edge portions 86. The sloping side portions have similar angles of approximately 37° to the horizontal, while the rear edge slope is advantageously made at a greater angle than the front edge slope, approximately 45° vs. 30°, to facilitate the discharge of the popped corn. The upper surface of the plate is preferably "anodized" to harden the surface. With this construction, the corn and cooking oil are readily maintained on the surface 85 during the oscillation of the popping basket.

As shown in Fig. 10, the basket bottom plate has a series of symmetrically arranged laterally spaced parallel holes 87, 88, 89, 90, and 91 bored therein and extending the full length of the plate. The holes 87, 88, 90 and 91 are arranged to hold cylindrical electrical heating cartridges 92 therein consisting of a metal casing containing a coil of nichrome wire or the like insulated therefrom. The cartridges fit relatively tightly into the holes with their rear ends projecting beyond the rear of the lower portion of the plate and have a sufficient length of heating element, to heat the full length of the plate surface 85. With the thermal expansion which occurs on heating, the cartridges are held tightly in contact with the metal of the plate. The cartridges are located a predetermined distance below the surface 85 and laterally spaced from one another to provide a substantially uniform heating of the entire area of the plate surface 85. If located too close to the surface, the cartridges would produce hot spots thereon. If the cartridges are located too far below the surface, the heating and cooling of the surface would be retarded. The cartridges are connected in parallel to a suitable electric power line, as diagrammatically indicated in Fig. 16. The power connections to the cartridges are at the rear end of the basket and the initially projecting portions of the heating elements are prevented from flexing by stringing beads of insulating material around each pair of insulated wires.

Figure 16:
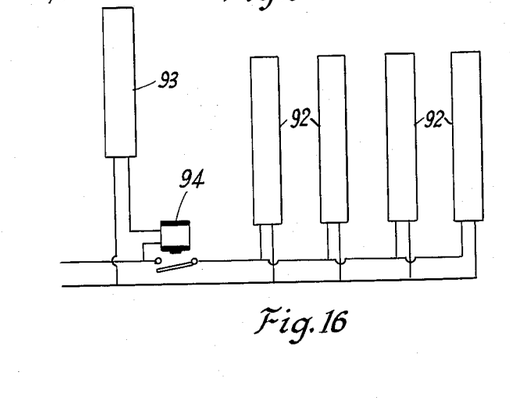
Fig. 16 is a wiring diagram of the popping basket heating circuit.

The central hole 89 is used to contain a thermal switch 93 responsive to and controlling the temperature of the popping plate. The switch 93, as shown in Fig. 8, is also of the cartridge type comprising a casing fitting tightly in the hole 89 and enclosing a pair of thermostatically operated contact members adjustably set to open and close when the machine is in operation whenever the temperature of the plate rises or falls a predetermined amount relative to a predetermined value, e. g. 412° F.±5° F. The thickness of the plate above the plate above the thermal switch is advantageously the same as the thickness of the metal between the heating cartridges and the plate surface. In one embodiment, the popping plate was of aluminum and four heating cartridges, each of 150 watts capacity, were spaced one-quarter inch below the surface of the plate. As indicated in Fig. 16, an electrical relay 94 is advantageously arranged in the thermal switch and heating cartridge circuit to prevent arcing in the thermal switch when cutting the cartridges in and out of operation.

The popping basket is continuously horizontally oscillated throughout the operating cycle. This movement is effected by a lever 95 secured to one side of an arcuate plate 96 having a fixed pivot 97 at its lower end and carrying a pair of diametrically spaced cam rollers 98 on one side thereof positioned in contact with the surface of the agitator cam 54. As shown in Fig. 14, the cam is formed with five symmetrically spaced points 99, over which, as the cam rotates at a constant speed, the cam rollers and plate 96 are oscillated forwardly and rearwardly. This motion is transmitted to the basket by a linkage consisting of a horizontal link 100 connecting the lever 95 to a yoke 101 pivoted on a pair of arms 102 projecting from the sides of the drain pan 80. The upper ends of the yoke arms are pivotally connected to a pair of horizontally projecting support arms 103 secured to the sides of the basket and holding the basket at the desired operating level within the drain pan. The arrangement of the pair of cam rollers 98 above and below the axis of the five pointed cam 54 assures a continuous and uniform roller contact with the cam, providing a smooth oscillatory motion of the basket which prevents the corn being popped from piling up at either end of the basket.

Near the end of the operating cycle the popping basket is lifted out of the drain pan 80 in order to dump the finished corn into the delivery chute 35. For this purpose the basket dumping cam 56 is synchronized with the loading cam 55 so that the cam 56 will depress a cam roller 105 carried by a lever 106 pivoted on the shaft 60, at the end of the desired popping period, as disclosed in said copending application. The free end of the lever is connected to a yoke 107, pivotally connected at its upper end to the front ends of the basket arms 103, through an adjustable link 108 having a ball and socket joint 109. The yoke arms 101 and 107 are detachably mounted on pivot pins on the basket arms 103 to facilitate the removal of the basket for cleaning. The dumping height of the basket can be raised or lowered by this screw adjustment on the ball and socket joint. The loading and dumping cams are timed to allow a delay of several seconds between the dumping of the popped corn and the loading of fresh corn into the basket, to compensate for possible override of the motor after the current supply is cut off.

The cooking or seasoning oil reservoir tank 37 is designed to use any standard type of cooking compound of the liquid, solid or hydrogenated type, a cocoanut base oil being preferred however having a melting temperature of approximately 76° F. To insure an adequate supply of liquified seasoning, an electrically operated immersion heater 110 is installed in the bottom of the tank. In operation, this heater will maintain the temperature of any normally solid cooking compound above its liquifying temperature. For example, the cooking oil in the lower part of the tank may be maintained at approximately 125° F.

Figures 3, 4, 5, 6, 7:
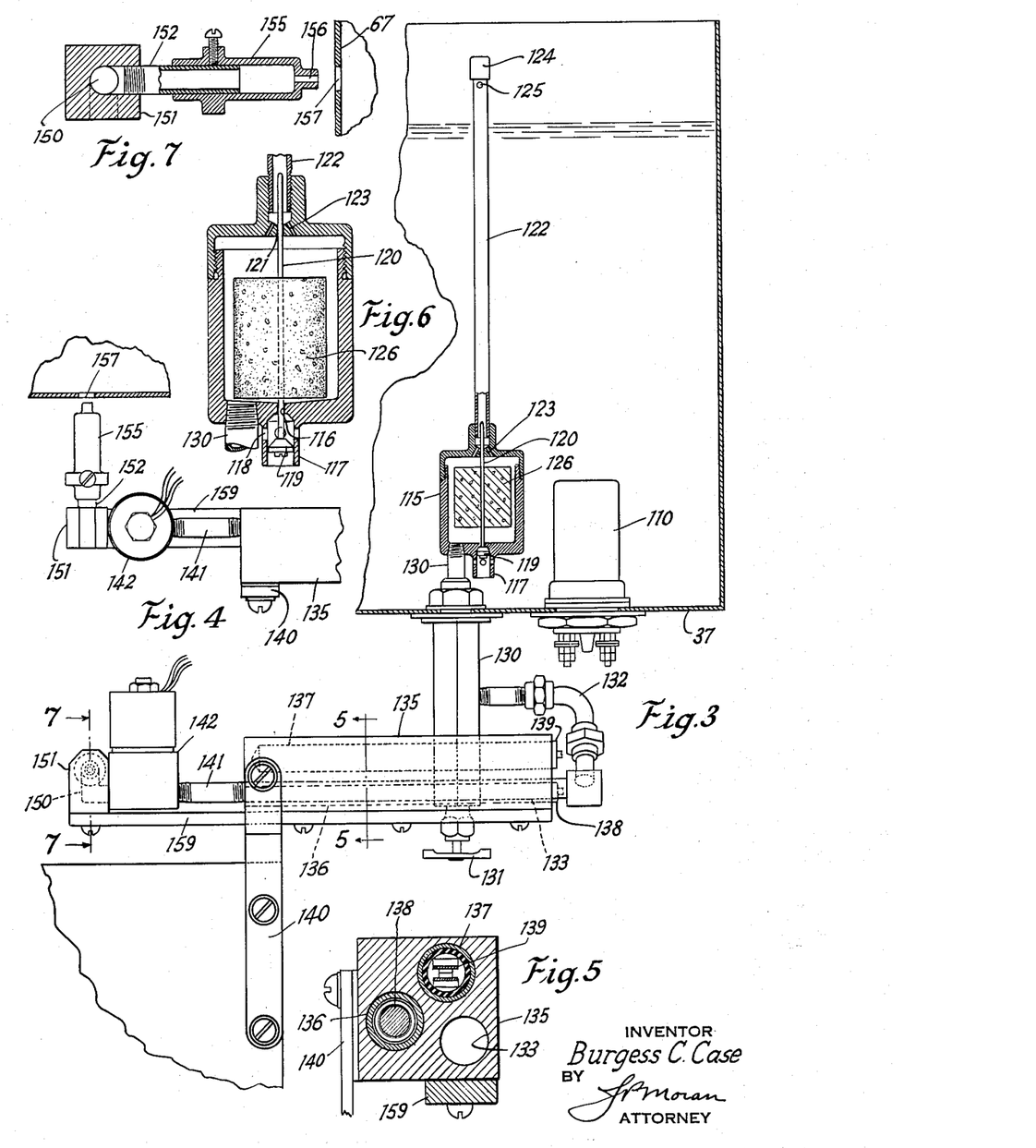
Fig. 3 is an enlarged view partly in section of the cooking oil supply provisions.
Fig. 4 is a plan view of a portion of the oil supply provisions shown in Fig. 3.
Fig. 5 is an enlarged vertical section taken on the line 5—5 of Fig. 3.
Fig. 6 is an enlarged view of the oil float valve shown in Fig. 3, in its open position.
Fig. 7 is an enlarged section of the oil nozzle taken on the line 7—7 of Fig. 3.

In accordance with the present invention, a charge of preheated cooking oil is delivered to the popping basket in an amount, e. g. 1½ liquid ounces, sufficient to provide a thin layer of hot cooking oil over the heating plate surface 85 and slightly more than the amount of cooking oil normally absorbed by the corn during the popping operation. Normally, the layer of cooking oil will be sufficient to submerge the major portion of each kernel positioned on the surface 85. The provision for this purpose include a charging system for delivering a predetermined amount of cooking oil from the tank 37 to the supply line. As shown in Figs. 3 and 6, a valve chamber 115 mounted on a standpipe 130 is positioned in the tank 37 above the bottom thereof and has a small inlet opening 116 in the bottom thereof surrounded by an open-ended guide tube 117 having openings 118 to the tank in the upper part thereof. A valve 119 carried by a stem 120, of smaller diameter than the inlet 116, is positioned in the guide tube 117. The valve stem extends upwardly through the inlet opening 116 and chamber 115 into a guide opening 121 in the top wall of the chamber. The upper end of the valve stem is located in a vertical tube 122 mounted on the chamber 115 and communicating therewith through openings 123 spaced around the guide opening 121. The upper end of the tube 122 has a cap 124 and side openings 125 therein above the normal cooking oil level in the tank 37. In this manner the chamber 115 is subjected to the atmospheric pressure above the oil level. The movement of the valve 119 is controlled by a float 126 mounted on the valve stem section within the chamber 115. When the float is in its lower position shown in Fig. 6, the valve 119 is below the guide tube openings 118, and cooking oil, under the hydraulic head in the tank, passes through the openings 118 and inlet 116 into the chamber 115. The oil entering the float chamber flows to the pipe 130 and when the pipe is filled, raises the float until the valve 119 closes the inlet 116, cutting off the supply of oil from the tank, as shown in Fig. 3. The float is adjustable to permit a predetermined level of oil in the float chamber before the valve 119 rises to its closed position.

The stand pipe 130 projects through the bottom of the oil tank 37 and supports the float chamber 115 and associated parts on its upper end. The lower end of the pipe is closed by a clean-out plug 131. With the valve 119 closed, the oil in the float chamber tends to pass into the pipe by gravity due to the atmospheric pressure in the float chamber whenever the pipe is partly emptied. The oil pipe 130 is connected by suitable pipe fittings 132 to a passage 133 through a block 135 of a metal having a high thermal conductivity, such as aluminum. The block 135 is horizontally elongated and provided with closed end holes 136 and 137 extending substantially the full length thereof and parallel and adjacent to the passage 133, as shown in Figs. 3 and 5. The passage 136 has an electrical heating cartridge 138, similar to the cartridges 92, closely fitting therein and, when connected to the electric power source, operating to heat the block 135 throughout its cross-section and thereby the oil in the passage 133. The passage 137 has a thermal switch 139, similar in construction to the switch element 93, closely fitting therein and set to open and close the electrical circuit containing the cartridge 138 when the block metal temperature rises and falls respectively a predetermined amount relative to a predetermined value, e. g. 415° F.±5°.

The block 135 is supported from the chassis by a vertical bar 140 having a thermally insulated connection to the block adjacent one end thereof. A pipe 141 of slightly smaller cross-sectional area connects the discharge end of the passage 133 to a solenoid valve 142, shown in detail in Fig. 15. The pipe 141 opens into a passage 143 having a vertical section 144 terminating in a beveled valve seat 145 adapted to receive a solenoid valve 146 having a conical lower end shaped to fit the valve seat tightly in its lower position and thus shut off the flow of cooking oil.

The solenoid coil 147 is periodically energized to raise the valve and permit a flow of oil from the passage 144 to an L-shaped discharge passage 148. The mechanism for this purpose includes a finger 160 mounted on the shaft 52 to rotate therewith. The finger has its outer end oppositely beveled, as indicated in Fig. 13, and positioned to contact a roller 161 on the lower end of a bell crank lever 162 which is held in the path of rotation of the finger by a coiled spring 163. The opposite leg of the lever carries an adjustable switch actuating member 164 which is arranged to control a microswitch 165 to control the operation of the solenoid valve 142. The microswitch is normally held open by the member 164 under the pressure of the spring 163. As the lower beveled surface of the finger deflects the roller 161, the member 164 is raised out of contact with the switch 165, allowing the switch to close and thus energize the solenoid valve 142. As the upper beveled surface of the finger moves out of contact with the roller 161, the member 164 returns to its lower position to open the micro-switch. The time, e. g. three seconds, in which the valve is held open is adjustable by adjusting the position of the member 164.

The lower end of the valve passage 148 is connected to the lower end of a modified Z-shaped passage 150 in a block 151 alongside valve 142. The passage 150 has a horizontal bottom leg, an intermediate vertical leg, and a forwardly inclined top leg arranged substantially perpendicular to the bottom leg. This angular arrangement of the passage sections provides successive changes in direction in the cooking oil supply passage. The top leg of the passage is connected to a pipe 152 inclined forwardly and upwardly at an angle of approximately 3°. The valve passages 143 and 148, block passage 150, and pipe 152 progressively reduce the cross-sectional area of the cooking oil supply passage. The pipe 152 fits into a nozzle 155 which is adjustably mounted on the forward end thereof. The nozzle 155 has an elongated restricted discharge orifice 156 at its forward end which is in axial alignment with an opening 157 in the rear wall of the popping basket. The nozzle end is spaced from the rear wall of the basket sufficiently to provide clearance during the reciprocation of the basket. The cooking oil temperature is advantageously maintained during its passage through the block 151 by securing an elongated bar 159 of a metal of high thermal conductivity, such as magnesium, to the bottom of the blocks 133 and 151 and in spaced relation to the solenoid therebetween, whereby heat is conducted to the block 151 from the heating cartridge 138.

In normal operation, a body of cooking oil, e. g. 2–3 liquid ounces, is confined in the conduit formed by the pipe 130, fittings 132, passage 133, pipe 141 and valve passages 143 and 144, the last named part being closed by the solenoid valve 146. The heating cartridge 138 has a sufficient heating capacity to heat the block 135 sufficiently to raise the temperature of the oil in the passage 133 to approximately 415° F. and maintain it at that temperature until discharged. The oil tends to expand at the higher temperature and creats a static pressure within the confined body of oil. Since the oil in the passages 133 is not exposed to air, oxidation of the hot oil is prevented.

When the finger 160 acts to energize the solenoid coil and raise the valve 146 from its closing position, the pressure in the confined body of oil causes it to rapidly discharge through the valve into the remaining part of the conduit system. The step-up and changing direction formation of the block passage 150 tends to hold back the initial portion of the discharging stream of oil, so that a solid stream of oil will flow in a straight unobstructed run through the pipe 152 and nozzle 155 to the orifice 156. The solid stream impinging on the restricted rear end of the orifice has sufficient velocity head to discharge a solid stream of oil with a relatively flat trajectory through the opening 157 into the oscillating popping basket throughout the oscillatory range, insuring a distribution of the oil over the entire bottom thereof. The oil stream lands on the center portion of the plate surface 85 and is rapidly distributed over that surface by the basket oscillations. The solenoid valve is normally open long enough for substantially all of the preheated oil in the passage 133 and pipe 141 to be discharged into the basket. The charge of oil enters the basket immediately prior to the dumping of the corn, so that the corn kernels fall into the layer of oil on the plate surface 85. The time differential, e. g. one second, between the completion of the oil discharge and the entry of the corn is sufficient to insure the oil layer being brought up to approximately the plate temperature.

When the solenoid coil is deenergized to allow the valve 146 to close by gravity, the discharging oil stream in the conduit system beyond the valve is moving at sufficient velocity that substantially all of the oil entering the pipe 152 and nozzle 155 is discharged. The arrangement of the elongated discharge orifice 156 above the bottom of the nozzle passage and the inclination of the pipe 152 prevent any undesirable dripping of oil from the orifice, any oil remaining tending to drain back into the passage 150.

The substantial emptying of the passage 133 causes the oil in the float chamber to drain into the standpipe 130. The float 126 drops to open the valve 119 and allows a fresh supply of oil to flow into the float chamber and pipe 130 until the float is raised to its valve closing position. The new charge of oil in the passage 133 is then rapidly heated to the predetermined temperature.

The coin controlled mechanism and motor switch assembly described in said copending application is adapted for use in the present machine to start the machine cycle on the insertion of a selected coin and shut off the machine on the completion of an operating cycle. The coin controlled mechanism is set to reject coins until the temperature of the oil in the block passage 133 has reached the desired operating temperature.

With the machine in its normal operating condition, the insertion of a predetermined coin in the coin control mechanism starts the operating cycle. The drive mechanism starts the basket oscillating and moves the loaded corn cup 42 in an arc about the pivot shaft 60. The solenoid valve 142 is then energized to allow the stream of cooking oil to be discharged from the nozzle 155 into the basket. The continued movement of the arm 62 causes the cover 65 to open the corn cup to engage the snubbing post 76 and dump its load of corn into the oscillating basket. The cup then returns to its corn loading position, while the basket cover closes automatically. The dumped corn is distributed over the basket plate surface 85 by the basket oscillations, a major portion of each kernel being covered by the layer of hot cooking oil. A popping period is used sufficient to insure the popping of every kernel of corn, so that when the dumping cam is actuated to raise and tilt the oscillating popping basket, all of the corn will be discharged in the desired popped condition.

The popping of the corn in the cooking oil results in the absorption of approximately all of the oil introduced in each charge of corn popped. The few drops of oil remaining on the bottom plate fall into the drain pan when the basket is dumped. The plate surface 85 is thus clean of oil in the periods between operating cycles, facilitating the maintenance of the machine in a sanitary condition. With a bottom plate surface 85 4″ x 4″ and the temperature conditions indicated, a charge of 1½ oz. of cooking oil has been found sufficient. The oil consumed is automatically replaced in the supply conduit by the operation of the float valve. The popped corn cascades out of the popping basket through the chute 35 into the bag inserted by the customer in the compartment 33. The operating cycle continues until the popping basket returns to its normal horizontal position in the drain pan 80. At this point the motor switch is actuated to shut off the current supply to the motor and complete the cycle. The machine illustrated and described is designed for a complete cycle of approximately ninety-five seconds with a popping period of approximately eighty-five seconds. The insertion of another coin immediately or at any time thereafter while the machine is in an operating condition will cause the cycle to be repeated in exactly the same manner, insuring a product of uniform quality and quantity.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of the invention may sometimes be used to advantage without a corresponding use of other features.

I claim:

1. In a batch type corn popping machine, a popping basket having an imperforate bottom plate and constructed to retain the popped corn therein, drive mechanism arranged and connected to horizontally oscillate said basket and to tilt said basket to a dumping position, means for supplying raw corn to said basket, electrical heating means carried by said basket and arranged to heat said bottom plate, and means for supplying a charge of cooking oil to said bottom plate while said basket is oscillating including an oil supply control valve, and means actuated by said drive mechanism arranged to actuate said control valve a predetermined time interval prior to the actuation of said raw corn supply means.

2. In a batch type corn popping machine, a popping basket having an imperforate bottom plate and constructed to retain the popped corn therein, drive mechanism arranged and connected to horizontally oscillate said basket and to tilt said basket to a dumping position, means for supplying raw corn to said basket, electrical heating means carried by said basket and arranged to heat said bottom plate, a thermal switch arranged to control said electrical heating means in response to the temperature of said bottom plate, and means for supplying a charge of cooking oil to said bottom plate while said basket is oscillating including a stationary nozzle spaced horizontally from said basket and arranged to discharge a stream of cooking oil in a horizontal trajectory towards said basket.

3. In a batch type corn popping machine, a popping basket having an imperforate bottom plate and constructed to retain the popped corn therein, drive mechanism arranged and connected to horizontally oscillate said basket and to tilt said basket to a dumping position, means for supplying raw corn to said basket while oscillating, electrical heating means carried by said basket and arranged to heat said bottom plate, and means for supplying a charge of cooking oil to said bottom plate while said basket is oscillating comprising a stationary nozzle spaced from said basket and positioned to discharge a stream of cooking oil through an opening in a side wall of said basket.

4. In a batch type corn popping machine, a popping basket having an imperforate bottom plate and constructed to retain the popped corn therein, drive mechanism arranged and connected to horizontally oscillate said basket and to tilt said basket to a dumping position, means for supplying raw corn to said basket, electrical heating means carried by said basket and arranged to heat said bottom plate, and means for supplying a charge of cooking oil to said bottom plate while said basket is oscillating and prior to the supplying of raw corn thereto comprising a nozzle positioned to discharge a stream of cooking oil into said basket, a cooking oil tank, conduit means connecting said tank and nozzle, a valve arranged to control the flow of cooking oil through said conduit means and means actuated by said drive mechanism arranged to actuate said control valve a predetermined time interval prior to the actuation of said raw corn supply means.

5. In a batch type corn popping machine, a popping basket having an imperforate bottom plate and constructed to retain the popped corn therein, drive mechanism arranged and connected to horizontally oscillate said basket and to tilt said basket to a dumping position, means for supplying raw corn to said basket while oscillating, electrical heating means carried by said basket and arranged to heat said bottom plate, and means for supplying a charge of cooking oil to said bottom plate while said basket is oscillating comprising a stationary nozzle spaced from said basket and positioned to discharge a stream of cooking oil htrough an opening in said basket, a cooking oil tank, conduit means connecting said tank and nozzle, a solenoid valve arranged to control the flow of cooking oil through said conduit means, and means for periodically opening said valve for a predetermined interval.

6. In a batch type corn popping machine, a popping basket having an imperforate bottom plate and constructed to retain the popped corn therein, drive mechanism arranged and connected to horizontally oscillate said basket and to tilt said basket to a dumping position, means for supplying raw corn to said basket, electrical heating means carried by said basket and arranged to heat said bottom plate, and means for supplying a charge of preheated cooking oil to said bottom plate while said basket is oscillating comprising a nozzle spaced horizontally from said basket and positioned to discharge a stream of cooking oil into said basket, a cooking oil tank, conduit means connecting said tank and nozzle, a valve arranged to control the flow of cooking oil through said conduit means, and means for heating a portion of said conduit means between said valve and said tank.

7. In a batch type corn popping machine, a popping basket having an imperforate bottom plate and constructed to retain the popped corn therein, drive mechanism arranged and connected to horizontally oscillate said basket and to tilt said basket to a dumping position, means actuated by said drive mechanism for supplying raw corn to said basket, electrical heating means carried by said basket and arranged to heat said bottom plate, and means for supplying a charge of preheated cooking oil to said bottom plate while said basket is oscillating comprising a nozzle positioned to discharge a stream of cooking oil into said basket, a cooking oil tank, a float controlled valve in said tank arranged to control the gravitational discharge of cooking oil from said tank, conduit means arranged to conduct cooking oil discharged from said tank to said nozzle, a valve arranged to control the flow of cooking oil through said conduit means, and electrical heating means for heating a portion of said conduit means between said tank and said valve.

8. In a batch type corn popping machine, a popping basket having an imperforate bottom plate and constructed to retain the popped corn therein, drive mechanism arranged and connected to horizontally oscillate said basket and to tilt said basket to a dumping position, means actuated by said drive mechanism for supplying raw corn to said basket while said basket is oscillating, electrical heating means carried by said basket and arranged to heat said bottom plate, and means for supplying a charge of cooking oil to said bottom plate while said basket is oscillating comprising a stationary nozzle spaced from and positioned to discharge a stream of cooking oil through an opening in said basket, a cooking oil tank, conduit means arranged to conduct cooking oil discharged from said tank to said nozzle, a solenoid valve arranged to control the flow of cooking oil through said conduit means, and means actuated by said driving means for opening said solenoid valve for a predetermined interval.

9. In a batch type corn popping machine, a popping basket having a relatively thick imperforate bottom plate and constructed to retain the popped corn therein, drive mechanism arranged and connected to horizontally oscillate said basket and to tilt said basket to a dumping position, means actuated by said drive mechanism for supplying raw corn to said basket while said basket is oscillating, electrical heating means carried by said basket and arranged to heat said bottom plate comprising a plurality of heating cartridges embedded in and symmetrically arranged relative to said bottom plate, a thermal switch embedded in the central portion of said bottom plate and arranged to control said electrical heating means in response to the temperature of said bottom plate, and means for supplying a charge of cooking oil to said bottom plate while said basket is oscillating.

10. In a batch type corn popping machine, a popping basket having an imperforate bottom plate and constructed to retain the popped corn therein, drive mechanism arranged and connected to horizontally oscillate said basket and to tilt said basket to a dumping position, means actuated by said drive mechanism for supplying raw corn to said basket, electrical heating means carried by said basket and arranged to heat said bottom plate, and means for supplying a charge of preheated cooking oil to said bottom plate while said basket is oscillating comprising a stationary nozzle positioned to discharge a stream of cooking oil through an opening in said basket, a cooking oil tank, conduit means arranged to conduct cooking oil discharged from said tank to said nozzle, a valve arranged to control the flow of cooking oil through said conduit means, electrical heating means for heating portions of said conduit means at opposite sides of said valve, and a thermal switch arranged to control said last named electrical heating means in response to the cooking oil temperature in one of said heated conduit portions.

11. In a batch type corn popping machine, a popping basket having an imperforate bottom plate and constructed to retain the popped corn therein, drive mechanism arranged and connected to horizontally oscillate said basket and to tilt said basket to a dumping position, means actuated by said drive mechanism for supplying raw corn to said basket, electrical heating means carried by said basket and arranged to heat said bottom plate, a thermal switch arranged to control said electrical heating means in response to the temperature of said bottom plate, and means for supplying a charge of cooking oil to said bottom plate while said basket is oscillating comprising a stationary nozzle horizontally spaced from and positioned to discharge a stream of cooking oil through an opening in said basket, a cooking oil tank, a float controlled valve in said tank arranged to control the discharge of cooking oil from said tank, conduit means arranged to conduct cooking oil discharged from said tank to said nozzle, a solenoid valve arranged to control the flow of cooking oil through said conduit means, and means actuated by said driving means for opening said solenoid valve for a predetermined interval prior to the supplying of raw corn to said basket.

12. In a batch type corn popping machine, a popping basket having an imperforate bottom plate and constructed to retain the popped corn therein, drive mechanism arranged and connected to horizontally oscillate said basket and to tilt said basket to a dumping position, means actuated by said drive mechanism for supplying raw corn to said basket while said basket is oscillating, electrical heating means carried by said basket and arranged to heat said bottom plate, comprising a plurality of heating cartridges embedded in and symmetrically arranged relative to said bottom plate, a thermal switch arranged to control said electrical heating means in response to the temperature of said bottom plate, and means for supplying a charge of preheated cooking oil to said bottom plate while said basket is oscillating comprising a stationary forwardly inclined nozzle horizontally spaced from and positioned to discharge a stream of cooking oil through an opening in the rear wall of said basket, a cooking oil tank, a float controlled valve in said tank arranged to control the discharge of cooking oil from said tank, conduit means arranged to conduct cooking oil discharged from said tank to said nozzle, a valve arranged to control the flow of cooking oil through said conduit means, electrical heating means for heating a portion of said conduit means between said tank and said valve, and a thermal switch arranged to control said last named electrical heating means in response to the cooking oil temperature in said conduit portion.

13. In a batch type corn popping machine, a popping basket having an imperforate bottom plate and constructed to retain the popped corn therein, drive mechanism arranged and connected to horizontally oscillate said basket and to tilt said basket to a dumping position, means actuated by said drive mechanism for supplying raw corn to said basket, electrical heating means carried by said basket and arranged to heat said bottom plate, and means for supplying a charge of cooking oil to said bottom plate while said basket is oscillating comprising a stationary forwardly inclined nozzle spaced from and positioned to discharge a stream of cooking oil through an opening in the rear wall of said basket, a cooking oil tank, a float controlled valve in said tank arranged to control the discharge of cooking oil from said tank, conduit means arranged to conduct cooking oil discharged from said tank to said nozzle, a solenoid valve arranged to control the flow of cooking oil through said conduit means, said conduit means having successive abrupt changes in direction between said solenoid valve and nozzle, and means actuated by said driving means for opening said solenoid valve for a predetermined interval prior to the supplying of raw corn to said basket.

14. In a batch type corn popping machine, a popping basket, drive mechanism arranged and connected to oscillate said basket and to tilt said basket to a dumping position, means actuated by said drive mechanism for supplying raw corn to said basket while said basket is oscillating, and separate means controlled by said drive mechanism for supplying a charge of cooking oil to said basket while said basket is oscillating and prior to the entry of raw corn into said basket.

15. In a batch type corn popping machine, a popping basket, a drive mechanism, means for supplying raw corn to said basket, and means actuated by said drive mechanism for oscillating said basket horizontally comprising a multi-pointed cam arranged to rotate about a horizontal axis, a pivoted plate having a linkage connection to said basket, and a pair of cam rollers on said plate at opposite sides of and arranged to contact said cam above and below the cam axis of rotation.

16. In a batch type corn popping machine, a popping basket having an imperforate bottom plate, a drive mechanism, means actuated by said drive mechanism for supplying raw corn to said basket, and means actuated by said drive mechanism for oscillating said basket horizontally comprising a five-pointed cam arranged to rotate about a horizontal axis, a pivoted arcuate plate having a linkage connection to said basket, and a pair of cam rollers on said plate at opposite sides of and arranged to contact said cam above and below the cam axis of rotation, and means controlled by said drive mechanism for supplying a charge of cooking oil to said bottom plate while said basket is oscillating.

References Cited in the file of this patent

UNITED STATES PATENTS

| | | |
|---|---|---|
| 588,186 | Rossi | Aug. 17, 1897 |
| 1,009,924 | Moores | Nov. 28, 1911 |
| 1,118,411 | Granz | Nov. 24, 1914 |
| 1,206,693 | Gillitt | Nov. 28, 1916 |
| 1,234,131 | Cleveland | July 24, 1917 |
| 1,497,025 | Priest | June 10, 1924 |
| 1,605,203 | Baxter | Nov. 2, 1926 |
| 1,681,099 | Clark | Aug. 14, 1928 |
| 1,738,908 | Kuhn et al. | Dec. 10, 1929 |
| 1,789,902 | Jackson | Jan. 20, 1931 |
| 1,839,671 | Hale | Jan. 5, 1932 |
| 2,134,682 | Burch | Nov. 1, 1938 |
| 2,216,805 | Case | Oct. 8, 1940 |
| 2,316,989 | Scott | Apr. 20, 1943 |
| 2,456,170 | Bennett | Dec. 14, 1948 |
| 2,554,802 | Waas | May 29, 1951 |